(12) United States Patent
Gao et al.

(10) Patent No.: US 11,643,758 B2
(45) Date of Patent: May 9, 2023

(54) PROTECTIVE TUBE

(71) Applicant: SHENZHEN JDD TECH NEW MATERIAL CO., LTD., Guangdong (CN)

(72) Inventors: Yaojun Gao, Guangdong (CN); Baohui Zhang, Guangdong (CN); Fengkai Yang, Guangdong (CN); Qiaoyun Yang, Guangdong (CN); Junjie Peng, Guangdong (CN); Wei Zhou, Guangdong (CN); Bosen Long, Guangdong (CN)

(73) Assignee: SHENZHEN JDD TECH NEW MATERIAL CO., LTD., Guangdong (CN)

( * ) Notice: Subject to any disclaimer, the term of this patent is extended or adjusted under 35 U.S.C. 154(b) by 134 days.

(21) Appl. No.: 16/769,365

(22) PCT Filed: Mar. 13, 2020

(86) PCT No.: PCT/CN2020/079136
§ 371 (c)(1),
(2) Date: Jun. 3, 2020

(87) PCT Pub. No.: WO2021/179278
PCT Pub. Date: Sep. 16, 2021

(65) Prior Publication Data
US 2021/0310160 A1 Oct. 7, 2021

(51) Int. Cl.
*D03D 1/00* (2006.01)
*D03D 3/02* (2006.01)

(52) U.S. Cl.
CPC ............ *D03D 1/0043* (2021.05); *D03D 3/02* (2013.01)

(58) Field of Classification Search
None
See application file for complete search history.

(56) References Cited

U.S. PATENT DOCUMENTS 4,803,103 A * 2/1989 Pithouse ................. B32B 27/12
138/123
5,300,337 A 4/1994 Andrieu et al.
(Continued)

FOREIGN PATENT DOCUMENTS

CN 1277643 A 12/2000
CN 1466667 A 1/2004
(Continued)

*Primary Examiner* — Shawn Mckinnon
(74) *Attorney, Agent, or Firm* — Rankin, Hill & Clark LLP

(57) ABSTRACT

The application relates to the technical field of wiring accessories, in particular to a protective tube. The protective tube includes a tube wall and fluffy warp yarns, wherein the tube wall forms a pipeline for a cable to be threaded therein and includes cross-woven first warp yarns and first weft yarns; the fluffy warp yarns are on an inner surface of the tube wall and are fluffier than the first warp yarns, the fluffy warp yarns are cross-woven with the first weft yarns and form a plurality of intersections with the first weft yarns, and each of the fluffy warp yarns spans a plurality of the first weft yarns between two adjacent intersections. When the protective tube is subjected to external impact, the tube wall with stronger hardness can protect the cable; moreover, the fluffy warp yarn reduce the friction between the protective tube and the cable.

7 Claims, 12 Drawing Sheets

(56) References Cited

U.S. PATENT DOCUMENTS

2005/0247249 A1    11/2005  Halman
2018/0223457 A1*   8/2018  Kaing ................... D03D 15/49

FOREIGN PATENT DOCUMENTS

| CN | 101052760 | A | 10/2007 |
|----|-----------|---|---------|
| CN | 102007239 | A | 4/2011 |
| CN | 203360724 | U | 12/2013 |
| CN | 105143535 | A | 12/2015 |
| CN | 105210250 | A | 12/2015 |
| CN | 108560275 | A | 9/2018 |
| CN | 109863263 | A | 6/2019 |
| CN | 109937513 | A | 6/2019 |
| CN | 201280831 | Y | 7/2019 |
| CN | 110382755 | A | 10/2019 |
| CN | 209818936 | U | 12/2019 |
| JP | S61157308 | A | 7/1986 |
| JP | 2002242045 | A | 8/2002 |

\* cited by examiner

PROTECTIVE TUBE

TECHNICAL FIELD

The application relates to the technical field of wiring accessories, in particular to a protective tube.

BACKGROUND ART

The existing electric appliances and the power source are connected through cables, and so are the electric elements of the electric appliances. The cables have to be clad and packaged by a protective tube to fix the scattered and disordered cables and protect the cables against external impact, especially for new-energy high-voltage wire harnesses.

SUMMARY OF THE INVENTION

Technical Problem

When the appliances are running or vibrating, the protective tube and the cable may move relative to each other and generate friction, which leads to noise, and the service life of the cable may be reduced due to the friction. A protective tube with strong hardness is provided to render enhanced shock resistance, however, the friction with the cable is further intensified by the protective tube with strong hardness.

Solution to the Problem

Technical Solution

It's an object of the present application to solve the problem of friction between a protective tube and a cable by providing an improved protective tube.

In order to solve the above problem, the present application provides a protective tube, comprising:

a tube wall, the tube wall forming a pipeline for a cable to be threaded therein and comprising cross-woven first warp yarns and first weft yarns; and fluffy warp yarns, the fluffy warp yarns being on an inner surface of the tube wall and being fluffier than the first warp yarns, the fluffy warp yarns being cross-woven with the first weft yarns and forming a plurality of intersections with the first weft yarns, and each of the fluffy warp yarns spanning a plurality of the first weft yarns between two adjacent intersections.

Advantageous Effects of the Invention

Advantageous Effects

The embodiment of the application has the following advantageous effects:

When the protective tube is used, the cable is threaded in the pipeline formed by the tube wall and contacts the fluffy warp yarns on the inner surface of the tube wall. Because the fluffy warp yarn is fluffier than the first warp yarn, when the protective tube is subjected to external impact, the tube wall with stronger hardness can protect the cable; moreover, the fluffy warp yarn plays a buffering role to reduce the friction between the protective tube and the cable. Moreover, a plurality of the first weft yarns are spanned by the fluffy warp yarn between two adjacent intersections formed by the fluffy warp yarn and the first weft yarn, so that the fluffy warp yarns can be enabled even fluffier, and the buffering effect of the fluffy warp yarns is further improved.

BRIEF DESCRIPTION OF THE DRAWINGS

In order to more clearly explain the embodiments of the present application or the technical solutions in the prior art, the drawings required for the description of the embodiments or the prior art will be briefly described below. Obviously, the drawings described below are only some embodiments of the present application. A person of ordinary skill in the art, without paying any inventive efforts, can also obtain other drawings from these drawings.

In the drawings.

DETAILED DESCRIPTION OF THE INVENTION

Figure 1:
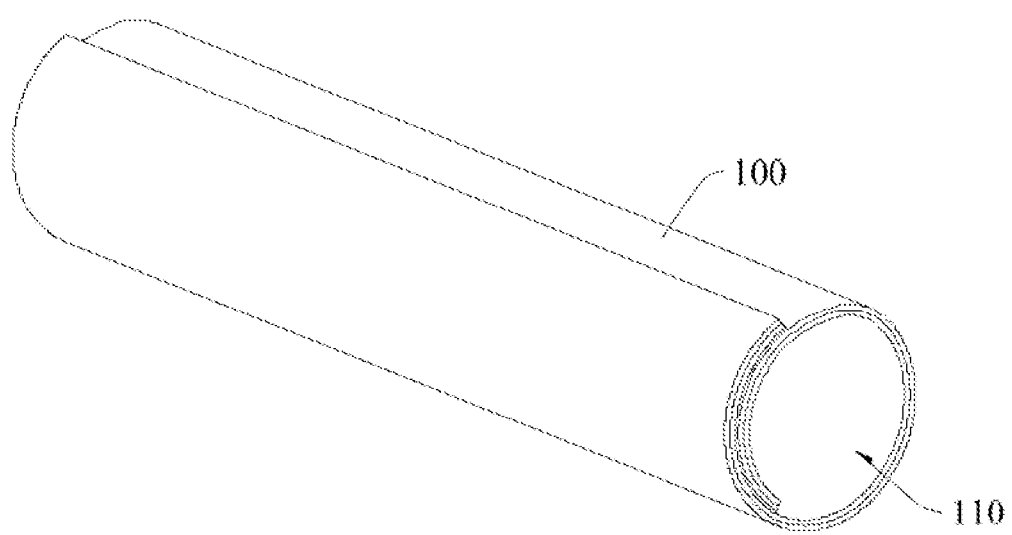
FIG. 1 is a schematic view showing a structure of a protective tube according to an embodiment of the present application.

The technical solution in the embodiments of the present application will be described clearly and completely with reference to the drawings in the embodiments of the present application. Obviously, the described embodiments are only a part of the embodiments of the present application, but not all of them. All other embodiments obtained by a person of ordinary skill in the art based on the embodiments in the present application without inventive efforts shall fall within the scope of the present application.

It should be noted that all directional indicators, such as up, down, left, right, front, rear and like, in the embodiments of the present application are used only to illustrate the relative positional relationships, motion conditions and the like between components in a particular pose (as shown in the drawings), and the directional indicators change accordingly if the particular pose changes.

In addition, descriptions referred to as "first", "second" and the like in this application are for illustrative purposes only and are not to be construed as expressing or implying relative importance or implicitly indicating the number of technical features. Thus, features defined by "first" and "second" may explicitly or implicitly include at least one of the described features. In addition, the technical solutions of the various embodiments can be combined, however, on the condition that the combination can be implemented by a person skilled in the art; a combination of the technical solutions showing conflicts or failing to be enforced shall be considered not to exist or not to fall within the scope the present application.

Figure 2:
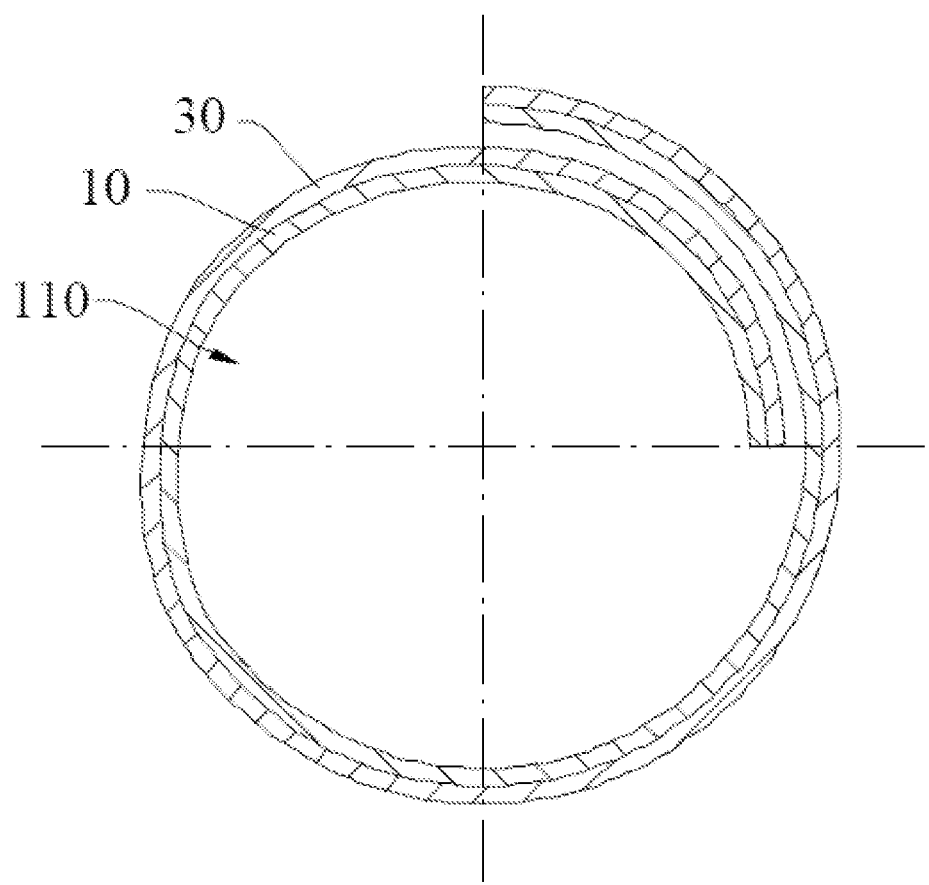
FIG. 2 is a schematic view of a cross-section of the protective tube of FIG. 1.
Figure 3:
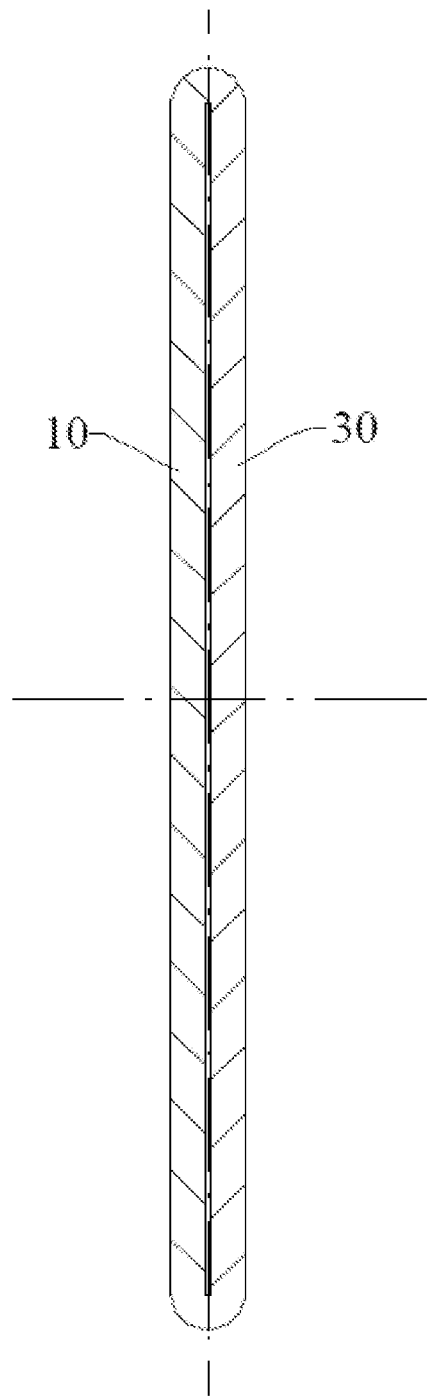
FIG. 3 is a schematic view of the structure of FIG. 2 when flattened.

As shown in FIG. 1, an embodiment of the present application provides a protective tube 100 for cladding and packaging a cable. With a combined reference to FIGS. 2 and 3, the protective tube 100 includes a tube wall 10 and an outer wall 30 which are in a laminated configuration, and the tube wall 10 and the outer wall 30 are self-rolled together to form a pipeline 110 for the cable to be threaded therein. For brevity of description, the tube wall 10 is divided into a first portion and a second portion which are sequentially connected in the weft direction, and a direction from the outer wall 30 to the tube wall 10 is defined as the inward direction. Referring primarily to FIG. 2, the first portion encloses the pipeline 110, that is, the inner surface of the first portion is the inner surface of the pipeline 110. The second portion clads at least part of the structure of the first portion, and the inner surface of the second portion overlaps with the outer surface of the outer wall 30 corresponding to the second portion. It should be noted that the present application takes a self-rolling protection tube as an example, but is not limited thereto.

Figure 4:
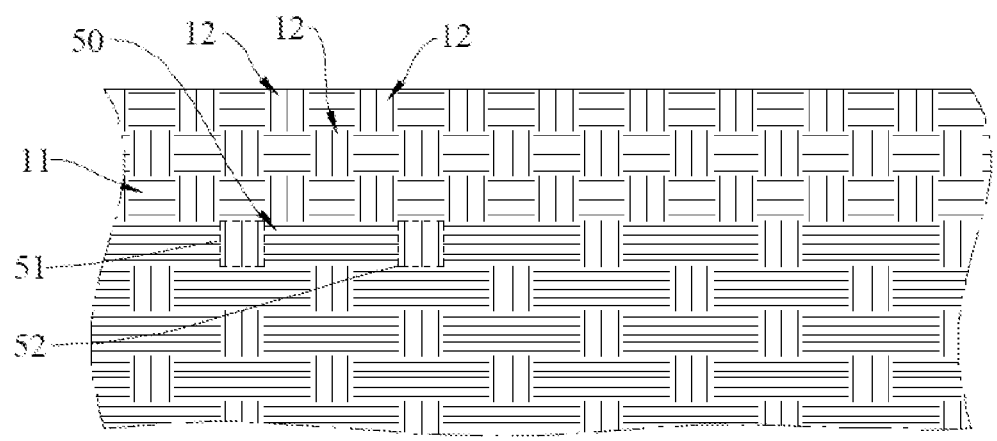
FIG. 4 is a schematic view showing a structure of an inner surface of a tube wall of FIG. 3.
Figure 5:
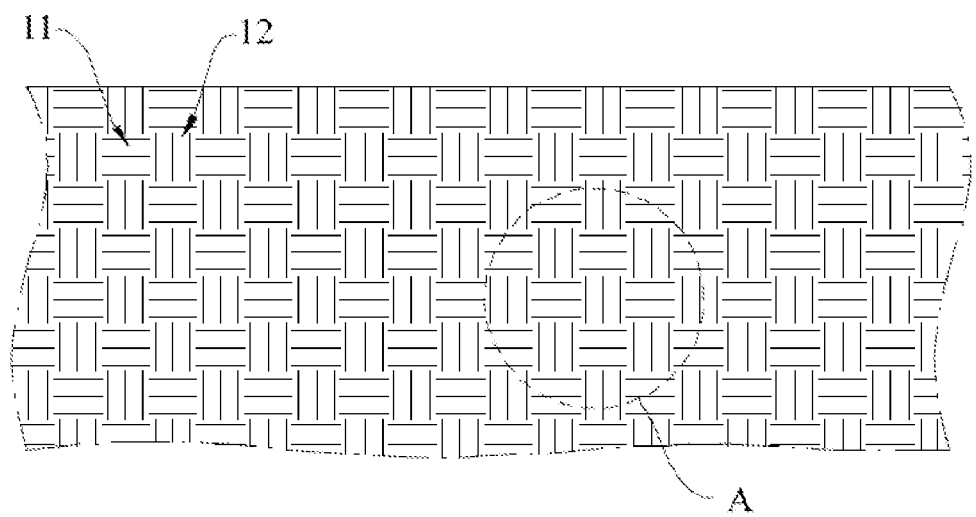
FIG. 5 is a schematic view showing a structure of an outer surface of the tube wall of FIG. 3.
Figure 6:
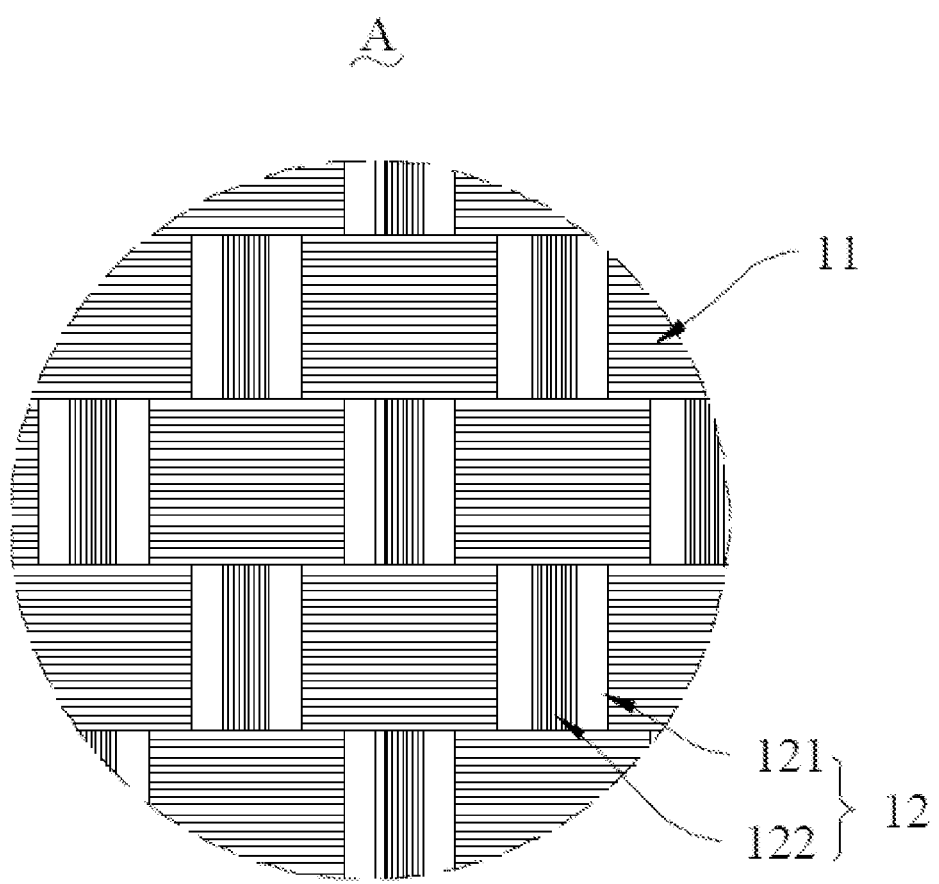
FIG. 6 is an enlarged partial view at A in FIG. 5.

Referring primarily to FIGS. 4 to 6, the tube wall 10 includes cross-woven first warp yarns 11 and first weft yarns 12. The protective tube 100 further includes fluffy warp yarns 50 on the inner surface of the tube wall 10 and the fluffy warp yarn 50 is fluffier than the first warp yarn 11. The fluffy warp yarn 50 can be made of materials such as air-textured yarns, elasticity-enhanced yarns, wool yarns, cotton yarns, embroidered yarns, linen yarns, teasel yarns, decorative yarns, bulked yarns, fancy yarns, chenille yarns and animal-hair yarns, etc. The fluffy warp yarns 50 are cross-woven with the first weft yarns 12 and form a plurality of intersections with the first weft yarns 12, and each of the fluffy warp yarns 50 spans the plurality of the first weft yarns 12 between adjacent intersections.

As will be appreciated, for the warp yarns, the intersection with the weft yarns refers to the position where the warp yarns are on the same side of the weft yarn. For example, in this embodiment, as shown in FIG. 4, an intersection 51 and an intersection 52 of the fluffy warp yarns 50 and the first weft yarns 12 are indicated by dashed boxes, wherein the intersection 51 and the intersection 52 are positions where the fluffy warp yarns 50 are on the inner side of the first weft yarns 12, and the intersection 51 and the intersection 52 are two adjacent intersections. Of course, it is also possible to position the intersection of the warp yarns and the weft yarns in such a way that the warp yarns are on the outer side of the weft yarns.

In this embodiment, each of the fluffy warp yarns 50 spans three first weft yarns 12 between two adjacent intersections. The fluffy warp yarns 50 can thus be enabled fluffy enough and to keep certain tension to ensure the buffering effect of the fluffy warp yarns 50. In other embodiments, each of the fluffy warp yarns 50 may span two or more first weft yarns 12 between adjacent intersections, and the number of the first weft yarns 12 between adjacent intersections is no more than ten to make sure that the fluffy warp yarns 50 keep certain tension.

When the protective tube 100 is used, the cable is threaded in the pipeline 110 formed by the tube wall 10 and contacts the fluffy warp yarns 50 on the inner surface of the tube wall 10. Because the fluffy warp yarn 50 is fluffier than the first warp yarn 11, when the protective tube 100 is subjected to external impact, the tube wall 10 with stronger hardness can protect the cable; moreover, the fluffy warp yarn 50 plays a buffering role to reduce the friction between the protective tube 100 and the cable. Moreover, a plurality of the first weft yarns 12 are spanned by the fluffy warp yarn 50 between two adjacent intersections formed by the fluffy warp yarns 50 and the first weft yarns 12, so that the fluffy warp yarns 50 can be enabled even fluffier, and the buffering effect of the fluffy warp yarns 50 is further improved.

It should be noted that since the protective tube 100 is a self-rolling protective tube in this embodiment, the inner surface of the tube wall 10 is not entirely in contact with the cable. Therefore, the fluffy warp yarns 50 of this embodiment are cross-woven only with the first weft yarns 12 in the first portion. In this way, not only can materials be saved, but also unaesthetic results caused by pilling due to exposure of the fluffy warp yarns 50 can be avoided.

It should be noted that in this embodiment, at the intersection of the fluffy warp yarns 50 and the first weft yarns 12, the fluffy warp yarns 50 and the first warp yarns 11 are on the same side of the first weft yarns 12 to facilitate the weaving of the fluffy warp yarns 50 with the first weft yarns 12. For this embodiment, referring primarily to FIG. 4, since three first weft yarns 12 span between adjacent intersections of the first warp yarn 11 and the first weft yarn 12, the number of the first weft yarns 12 between adjacent intersections is odd to make sure that the fluffy warp yarns 50 are always on the same side of the first weft yarns 12 as the first warp yarns 11 at the intersection of the fluffy warp yarns 50 and the first weft yarns 12.

Figure 7:
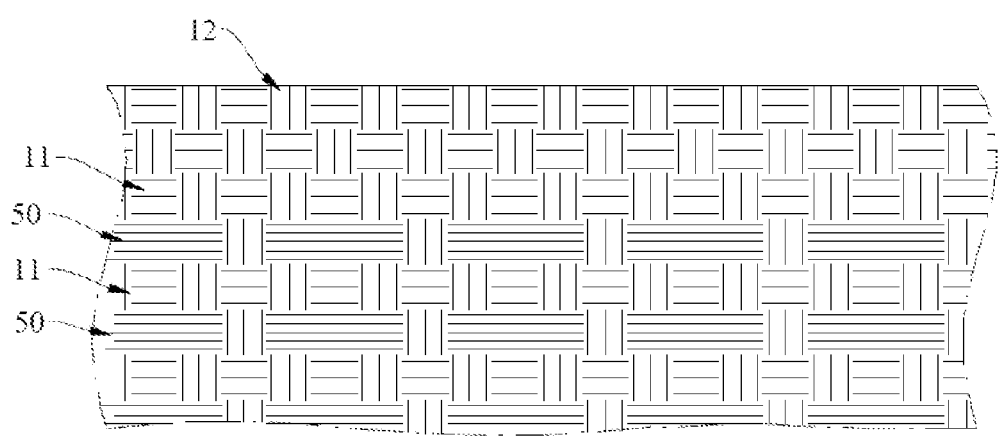
FIG. 7 is a schematic view showing the structure of the inner surface of the wall of the protective tube according to another embodiment.

Furthermore, two adjacent fluffy warp yarns 50 may be spaced apart by a first warp yarn 11. As shown in FIG. 7, a first warp yarn 11 is sandwiched between two adjacent fluffy warp yarns 50 so that the fluffy warp yarns 50 have sufficient weaving space. In other embodiments, a plurality of the first warp yarns 11 may be sandwiched between two adjacent fluffy warp yarns 50 to render a reasonable arrangement according to diameters of the first warp yarn 11 and the fluffy warp yarn 50.

Furthermore, referring primarily to FIGS. 5 and 6, the first weft yarn 12 includes monofilaments 121 and multifilaments 122, and a diameter of the monofilament 121 is 0.1 mm to 1 mm. The monofilament 121 is relatively thick and rigid to facilitate self-rolling to form the pipeline 110, and to impart strength to the tube wall 10 to resist external impact.

Figure 8A:
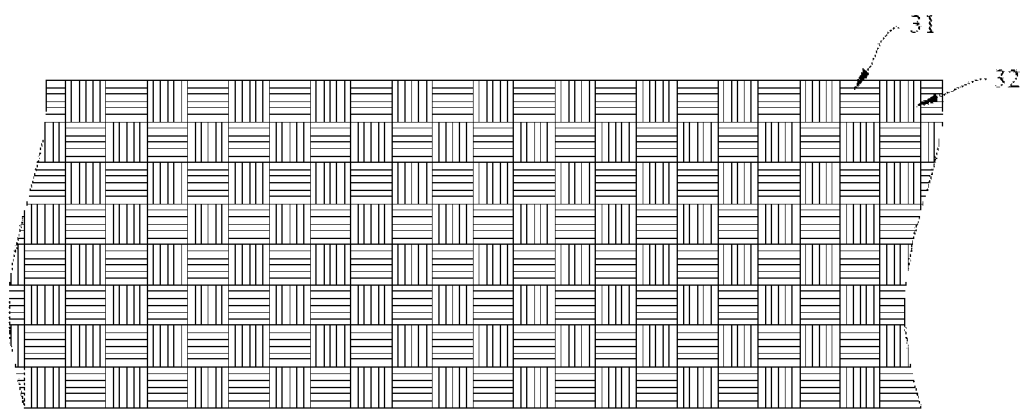
FIGS. 8A to 8D are schematic views showing a structure of an outer wall of the protective tube in various embodiments.
Figure 8B:
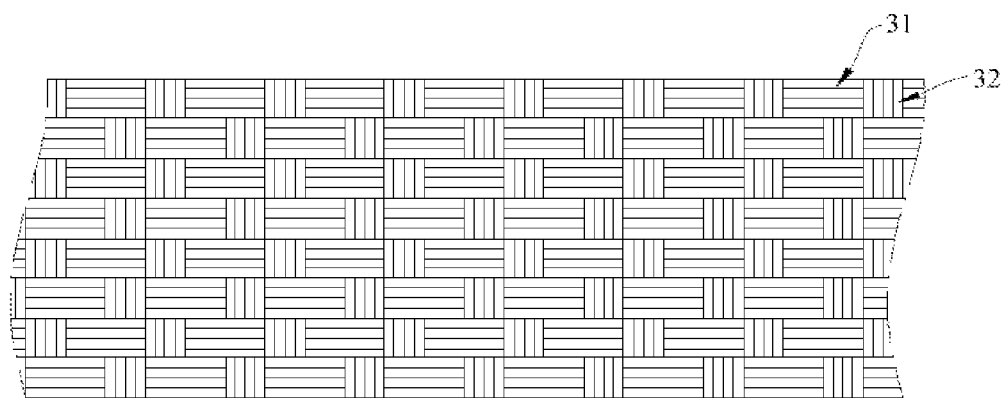
Figure 8C:
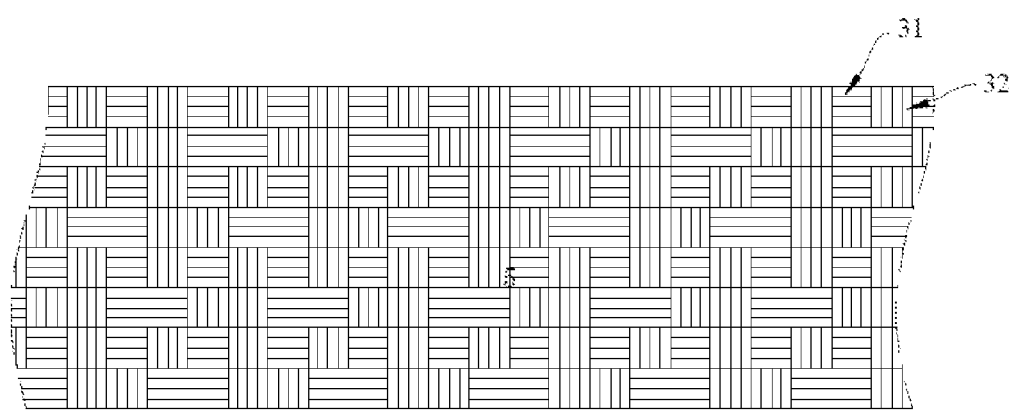
Figure 8D:
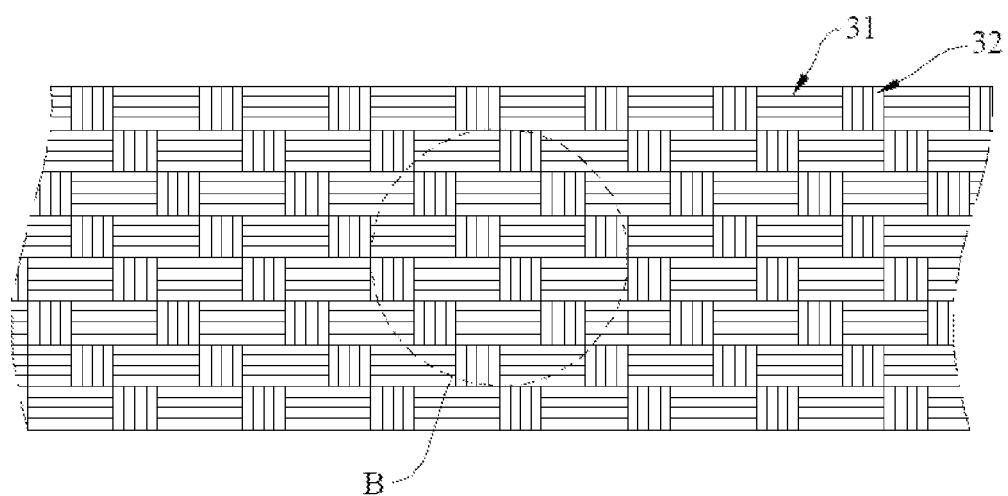
Figure 9:
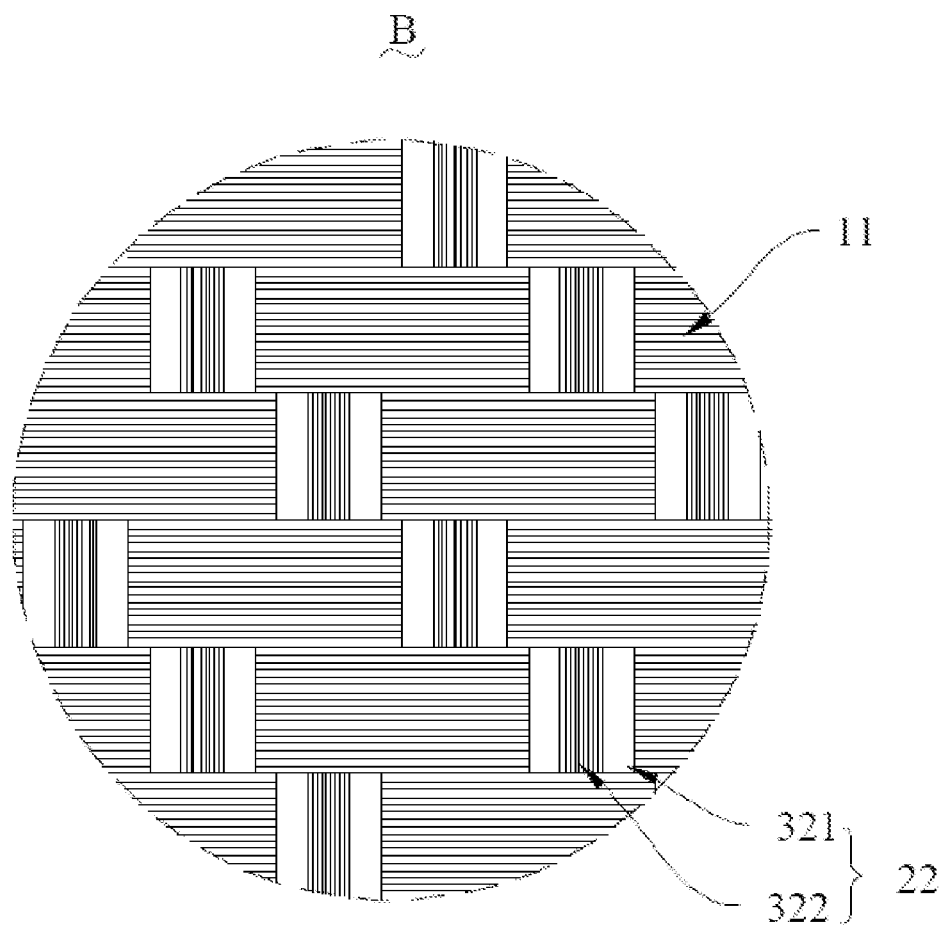
FIG. 9 is an enlarged partial view at B in FIG. 8D.

Referring primarily to FIGS. 8A to 8D, there is shown an outer wall 30 woven using different weaving methods. As illustrated in FIG. 8D, and in conjunction with FIG. 9, the outer wall 30 includes cross-woven second warp yarns 31 and second weft yarns 32, and the second weft yarn 32 includes monofilaments 321 and multifilaments 322, the monofilament 321 having a diameter of 0.1 mm to 1 mm, capable of enhancing the strength of the outer wall 30 and facilitating the self-rolling of the protective tube 100 to form the pipeline 110.

Furthermore, the color of the outer surface of the tube wall 10 is different from the color of the outer wall 30. In this way, when the outer wall 30 is worn after abrasion, the tube wall 10 is exposed, and different colors can play a warning role, thereby facilitating a quick identification of the degree of wear and maintenance. It will be appreciated that, to make sure that the outer surface of the tube wall 10 has a different color from the outer surface of the outer wall 30, the tube wall 10 and the outer wall 30 may be made of weaving materials of different colors or the outer surface of the tube wall 10 is painted, without limitation thereto.

It should be noted that, in this embodiment, the protective tube 100 has a two-layer structure, which can enhance the hardness of the protective tube 100 instead of complicating the structure of the protective tube 100 too much, and the protective tube 100 is rendered to have a proper weight. In other embodiments, the protective tube 100 may also have a single-layer structure, that is, having only the tube wall 10; alternatively, the protective tube 100 may have more than three layers.

Although the present application has been described with reference to the preferred embodiments, it is to be understood that the scope of the application is not limited thereto; equivalent modifications made without departing from the claims of the present application shall fall within the scope of the present application.

The invention claimed is:

1. A protective tube, comprising:
   a tube wall comprising a first portion and a second portion sequentially connected in the weft direction, the first portion comprising cross-woven fluffy warp yarns and first weft yarns, the second portion comprising first warp yarns cross-woven with the first weft yarns, and
   an outer wall arranged on an outer surface of the tube wall and comprising cross-woven second warp yarns and second weft yarns;
   wherein the tube wall and the outer wall are rolled to form a pipeline for a cable to be threaded therein;
   wherein the fluffy warp yarns are fluffier than the first warp yarns, the fluffy warp yarns form a plurality of intersections with the first weft yarns, and each of the fluffy warp yarns includes a portion that spans, only on an inner surface of the tube wall, a plurality of the first weft yarns between two adjacent intersections of the plurality of intersections such that the portion is exposed only on an inner surface of the tube wall so as to be exposed in a radially inward direction for contact with the cable;
   wherein the second portion of the tube wall radially overlaps a part of the first portion of the tube wall; and
   wherein the fluffy warp yarns comprise air-textured yarns, wool yarns, cotton yarns, embroidered yarns, linen yarns, teasel yarns, bulked yarns, chenille yarns, or animal-hair yarns.

2. The protective tube according to claim 1, wherein the portion of each of the fluffy warp yarns spans two to ten of the first weft yarns between two adjacent intersections.

3. The protective tube according to claim 1, wherein two adjacent fluffy warp yarns are spaced apart by one of the first warp yarns arranged therebetween.

4. The protective tube according to claim 1, wherein a color of the outer surface of the tube wall is different from a color of the outer wall.

5. The protective tube according to claim 1, wherein the second weft yarns comprises monofilaments and multifilaments, and a diameter of the monofilaments is 0.1 mm to 1 mm.

6. The protective tube according to claim 1, wherein the fluffy warp yarns are cross-woven only with the first weft yarns in the first portion.

7. The protective tube according to claim 1, wherein the first weft yarns comprises monofilaments and multifilaments, and a diameter of the monofilaments is 0.1 mm to 1 mm.

* * * * *